United States Patent Office 2,964,490
Patented Dec. 13, 1960

2,964,490

BUTADIENE COPOLYMER RUBBER-SILICA MASTERBATCH AND PROCESS OF PREPARATION

Louis H. Howland, Watertown, and Woodrow W. White, Oxford, Conn., assignors to United States Rubber Company, New York, N.Y., a corporation of New Jersey No Drawing. Filed Mar. 12, 1957, Ser. No. 645,410

12 Claims. (Cl. 260—41.5)

This invention relates to highly reinforced synthetic rubbers.

We have found that in the case of synthetic rubbers containing basic functional groups, e.g. copolymers of butadienes and copolymerizable monomers containing an amino group, exceptional reinforcing properties are obtained where an alkali-metal silicate is mixed with the alkaline latex and a masterbatch of synthetic rubber and silica are coprecipitated from the latex and alkali-metal silicate mixture by treatment with an acid. Such exceptional reinforcement is not obtained where dry so-called reinforcing silicas, such as hydrated silica (commercial Hi-Sil), are milled into the rubber, nor where the masterbatch is prepared by coprecipitating a mixture of such a latex and an aqueous dispersion of such a previously prepared hydrated silica, as shown in Leukhardt et al. U.S. Patent 2,616,860. Such exceptional reinforcement is not obtained in the case of rubbers which do not contain a basic functional group; instead, coprecipitated silica acts merely as an inert filler. The great improvement of the present invention is believed to be due to salt formation between the basic functional groups in the rubber and the in situ prepared silica which is acidic. Also, when very fine fillers are prepared separately and then incorporated into rubbers, either by mill mixing or latex masterbatching, handling difficulties are encountered with the fine fillers because of the large bulk involved. Furthermore, when the fillers are prepared separately, this necessitates additional processing and handling costs which are eliminated by preparing the silica in situ as is done by our invention.

In carrying out the present invention, an alkali-metal silicate is incorporated in the alkaline latex of the synthetic rubber containing basic functional groups, and an acid is mixed therewith to produce a final pH of less than 7 in the aqueous medium of the coagulated synthetic rubber and the in situ prepared silica at the completion of the coagulation of the masterbatch, i.e. after addition of the acid. The final pH is generally from 2 to 6 and preferably from 4 to 6. The acid used in reducing the pH during coprecipitation of the silica and rubber may be any of the common mineral acids or organic acids which are capable of reducing the pH of the flocculating mixture to below 7, e.g. sulfuric, hydrochloric, nitric and acetic acids. The amount of silica will generally be from 5 to 100 parts per 100 parts of the rubber, with the preferred range being from 10 to 60 parts of silica per 100 parts of rubber.

The alkali-metal silicate which is mixed with the latex may be any of the commercial silicates having varying proportions of sodium or potassium oxide to silicon dioxide content. For example, "N" brand sodium silicate (Philadelphia Quartz Co.) is sold in the form of an aqueous solution of about 38% solids content, in which ratio $Na_2O:SiO_2$ is about 1:3.2. "RU" brand sodium silicate (Philadelphia Quartz Co.) is sold in the form of a 47% aqueous solution in which the ratio $Na_2O:SiO_2$ is about 1:2.4. "KaSil No. 1" brand potassium silicate (Philadelphia Quartz Co.) is sold in the form of a 27% aqueous solution in which the ratio $K_2O:SiO_2$ is about 1:2.5. Other commercial alkali-metal silicates have ratios of alkali-metal oxide to silicon dioxide of 1:1.6, 1:2.0, 1:2.9, 1:3.75. Various other silicates, such as sodium meta silicate ($Na_2O.SiO_2$) and ordinary water glass ($Na_2O.4SiO_2$) may be used.

The synthetic rubbers containing basic functional groups to which the present invention is applicable are copolymers of one or more butadienes-1,3, e.g., butadiene-1,3, 2-methyl butadiene-1,3, chloroprene, piperylene, and 2,3-dimethyl butadiene-1,3, and one or more compounds which contain a $CH_2=C<$ group at least one of which contains an amino group, and which are copolymerizable with butadienes-1,3, such as vinyl pyridines, e.g., 2-vinyl pyridine, 3-vinyl pyridine, 4-vinyl pyridine, 2-methyl-5 vinyl pyridine, 5-ethyl-2 vinyl pyridine, 2,4-dimethyl-6 vinyl pyridine, 2,4-diethyl-6 vinyl pyridine, and dialkylaminoalkyl acrylates, e.g., 2-dimethylamino-ethyl methacrylate and 2-diethylaminoethyl methacrylate, dimethallylamine, ethylmethallylamine, N(dimethylamino-ethyl) methacrylamide, vinyl quinoline and p-N,N-dimethylamino styrene. Examples of compounds containing a $CH_2=C<$ group but not containing an amino group and which may be copolymerized with such butadienes and compounds which contain a $CH_2=C<$ group and an amino group are styrene, alpha-methyl styrene, vinyl toluene, chlorostyrene, dichlorostyrene, acrylonitrile, methacrylonitrile, alkyl acrylates, alkyl methacrylates, isopropenyl methyl ketone, e.g. in forming terpolymers of butadiene-1,3, vinyl pyridine and styrene. Such synthetic rubber will generally contain a major proportion (51 to 95%) of the butadiene component and a minor proportion (5 to 49%) of the component containing an amino group. In the preparation of such a rubber copolymer of a butadiene-1,3 with an unsaturated compound containing a basic nitrogen functional group, the compound containing the basic functional group may be copolymerized with the 1,3-butadiene in aqueous emulsion to form the latex directly as above described, or the compound containing the basic functional group may be graft polymerized on the rubber particles of a natural latex or of a latex prepared without such basic functional groups, or the solid rubber containing basic functional groups may be dispersed in water with conventional emulsifying and dispersing agents to form the latex, or a solid rubber not containing basic functional groups may be dispersed in water to form a latex and the compound containing basic functional groups graft polymerized on the rubber particles in such latex. The latices of such synthetic rubbers may be compounded with compounding ingredients, extenders, softeners, plasticizers and the like before being coprecipitated with the silica.

Additional surface-active dispersing agents to those present in the latex may be incorporated in the latex and alkali-metal silicate mixture to minimize premature flocculation of the rubber as well as to facilitate the formation of the silica in very fine particulate form. Examples of such surface-active dispersing agents are anionic surface-active agents such as sodium alkyl naphthalene sulfonates, alkyl and aromatic sulfonates having an organic radical containing more than 8 carbon atoms, alkali salts of lignin and alkali salts of partially desulfonated lignin sulfonates, and non-ionic surface-active agents such as polyether alcohols, alkyl aryl ethers of polyethylene glycols and polyalkylene-glycol ethers. Up to 15 parts of such surface-active dispersing agent per 100 parts of rubber of the latex may be used. Also auxiliary flocculants, such as polyethylene polyamines (see Leukhardt et al. U.S. Patent 2,616,860), may be incorporated in the latex and alkali-metal silicate mixture to insure complete precipitation of the rubber and silica. Up to 5 parts of such polyethylene polyamine per 100 parts of rubber of the latex may be used. Such polyethylene polyamine may be added to the latex-silicate mixture prior to addition of the acid, or may be added with the acid, or may be added after the pH is reduced to below 7 by the acid.

The flocculation of the latex-silicate mixture may be accomplished by adding the acid solution to the alkaline latex-silicate mixture or the latex-silicate mixture may be added to the acid solution. Furthermore, the latex-silicate mixture may be creamed with an alkali salt, e.g. sodium chloride, prior to addition of the acid coagulating solution, as is common practice in the two step coagulation of straight synthetic rubber latex, or such alkali salt may be mixed with the acid to give a single coagulant solution. The masterbatches may be compounded in conventional manner with compounding and vulcanizing ingredients, and if desired additional fillers. The masterbatches either compounded or uncompounded may be treated or processed by methods known to the art prior to vulcanization. For example, they may be heated to elevated temperature, such as 375° F. before masticating, or may be masticated at low temperatures or at high temperature, such as 375° F. before finishing and vulcanizing. Such compounds may be used in the manufacture of all types of rubber articles, such as tires, heels, soles, belting and the like.

The following illustrates the present invention and its improvement over the prior art reinforcement by latex masterbatching and mill mixing with previously prepared hydrated silica.

A synthetic rubber latex made by the copolymerization in aqueous emulsion of a mixture of 75 parts of butadiene-1,3 and 25 parts of 2-methyl-5-vinyl pyridine having a rubber content of 24.1% was used to prepare Compounds A, B and C.

Two flocculations were made by the following procedure and mixed to give the masterbatch A according to the present invention: 1030 mls. (250 grams of dry rubber) of the latex was stabilized against oxidation by the addition of 18.7 mls. (3.75 grams dry weight) of a 20% aqueous emulsion of condensed diphenylamine acetone reaction product. To this mixture was added with agitation 82.5 mls. (12.5 grams dry weight) of a 15% solution of the sodium salt of lignin (Indulin A—West Virginia Pulp & Paper Co.). To this was then added with agitation 700 grams (100 grams of $SiO_2$) of a solution of sodium silicate which had been prepared by mixing 350 grams of water with 350 grams of sodium silicate solution which had a specific gravity of 41° Bé. and contained 8.9% $Na_2O$ and 28.65% $SiO_2$. The resulting mixture was flocculated by the addition of 1375 mls. of a solution which contained 79.1 grams of sodium chloride and 59.1 grams of sulfuric acid thus giving an aqueous slurry containing very fine crumbs of synthetic rubber coagulum very closely associated with coprecipitated silica. The mixture was filtered with suction through #4 Whatman's filter paper giving a clear serum with a pH of 5.0 for the first batch. The filter cake was reslurried and filtered twice. The crumb was dried overnight at 50–55° C. in a forced draft oven. The yields of masterbatch were 381 and 390 grams respectively for the two batches and this material was rubber-like in appearance and color.

A second masterbatch B was prepared using the same latex and coprecipitating it with an aqueous slurry of a commercial hydrated silica reinforcing filler (Hi-Sil) by the procedure of Leukhardt et al. U.S. Patent 2,616,860. Two flocculations were made by the following procedure. 1033 mls. (250 grams of dry rubber) of the latex was stabilized against oxidation by the addition of 18.7 mls. (3.75 grams dry weight) of a 20% aqueous emulsion of condensed diphenylamine acetone reaction product. To this mixture was added with agitation a slurry of Hi-Sil which had been prepared by slurrying 100 grams of dry Hi-Sil into 560 mls. of water which contained 0.5 grams of tetraethylene pentamine. This mixture was then heated to 50° C. and then added slowly with very mild agitation to a flocculation solution which was also at 50° C. The flocculating solution had been prepared by adding 25 grams of glacial acetic acid and 2.5 grams of bone glue to 3000 mls. of water. The slurry of fine particles was then filtered, washed and dried giving a dry yield of 701 grams total for the mix of the two batches. The dried material was light colored and there was some free silica powder which dusted out of the product (that is it was "crocking").

Some of the same latex also stabilized against oxidation as above was flocculated by a conventional salt-acid flocculation procedure and dried to obtain a rubber stock C. Into rubber stock C was mixed 40 parts of Hi-Sil per 100 parts of the rubber, which was the same ratio of silica to rubber as in masterbatches A and B.

An amount of masterbatches A and B, each containing 400 grams of rubber and 160 grams of silica, and 400 grams of rubber stock C mill-mixed with 160 grams of Hi-Sil, were further compounded on a 6" laboratory mill with 60 grams of hydrocarbon softening oil (Circosol 2XH), 10 grams of stearic acid, 10 grams of sulfur, 25 grams of zinc oxide, 5 grams of benzothiazole disulfide, 1.5 grams of tetramethylthiuram disulfide, 4 grams of 2,6-di-tert. butyl-p-cresol and 15 grams of diethylene glycol. These are compounds I, II and III, respectively.

As a control for comparison with conventional rubber compounds, 400 grams of a commercial GR–S synthetic rubber copolymer of 72 parts of butadiene and 28 parts of styrene (recipe charge) was compounded with 200 of carbon black (Philblack O), 4 grams of stearic acid, 8 grams of sulfur, 18 grams of zinc oxide, and 3.6 grams of diphenyl guanidine. This is compound IV.

Compounded Mooney viscosities were run on compounds I to IV. Compounds I to IV were cured at 292° F. for varying times, and modulus, tensile strengths and elongations were run on test pieces of the vulcanizates. Abrasion losses were determined on cured test pieces on a modified Lambourn abrader as described in Rubber Chemistry and Technology 25, 191–208. Abrasion Resistance Ratings were determined from the abrasion losses using compound IV as a standard (100%) or Rating Control; the higher the rating figure of comparative compounds, the greater is the abrasion resistance.

Results of tests on compounds I to IV are shown in the following table:

*Table of physical properties*

| Compound Number | I | II | III | IV |
|---|---|---|---|---|
| Compounded Mooney Viscosity, ML–4 | 115 | 33 | 26 | 69 |
| 300% Modulus, p.s.i.: | | | | |
| 25' | | 970 | | 870 |
| 50' | 2,910 | 1,000 | | 1,870 |
| 100' | | 980 | | 2,510 |
| Tensile Strength, p.s.i.: | | | | |
| 25' | 2,560 | 1,320 | 540 | 2,210 |
| 50' | 2,930 | 1,370 | 490 | 3,510 |
| 100' | 2,260 | 1,630 | 520 | 3,580 |
| Elongation, percent: | | | | |
| 25' | 250 | 400 | 280 | 610 |
| 50' | 310 | 400 | 270 | 480 |
| 100' | 210 | 450 | 280 | 390 |
| Abrasion Resistance Loss, gms./3,000 ft.: | | | | |
| 25' | 0.155 | 0.154 | 0.286 | 0.300 |
| 50' | 0.163 | 0.159 | 0.265 | 0.224 |
| 100' | 0.169 | 0.167 | 0.200 | 0.195 |
| Abrasion Resistance Rating, percent: | | | | |
| 25' | 132 | 132 | 98 | [1] 100 |
| 50' | 116 | 117 | 92 | [1] 100 |
| 100' | 107 | 108 | 99 | [1] 100 |
| Ave | 118 | 119 | 96 | [1] 100 |

[1] Rating control.

Column I of the above table shows the high degree of reinforcement of butadiene-vinyl pyridine copolymer synthetic rubbers by the coprecipitated silica of the present invention as compared to latex masterbatching (column II) and mill mixing (column III) with previously prepared silicas and as compared to carbon-black reinforcement (column IV) of conventional butadiene-styrene copolymer synthetic rubber. The high compounded Mooney viscosity of column I illustrates exceptional reinforcing as do the higher tensiles of column I as compared to the compounded Mooney viscosities and tensiles of columns II and III.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. A process which comprises incorporating an alkali-metal silicate in a latex of a rubber copolymer of a butadiene-1,3 with an unsaturated compound containing a basic nitrogen functional group, and coagulating said rubber and forming a masterbatch therewith of coprecipitated silica in the form of filterable crumbs by mixing an acid with such latex containing the alkali-metal silicate to produce a pH of less than 7 in the aqueous medium of the coagulated synthetic rubber and coprecipitated silica at the completion of the coagulation of the masterbatch.

2. A process which comprises incorporating an alkali-metal silicate in a latex of a rubber copolymer of a butadiene-1,3 with an unsaturated compound containing an amino group, and coagulating said rubber and forming a masterbatch therewith of coprecipitated silica in the form of filterable crumbs by mixing an acid with such latex containing the alkali-metal silicate to produce a final pH of 2 to 6 in the aqueous medium of the coagulated synthetic rubber and coprecipitated silica at the completion of the coagulation of the masterbatch.

3. A process which comprises incorporating an alkali-metal silicate in a latex of a synthetic rubber copolymer of a butadiene-1,3 and a copolymerizable monomer containing an amino group, and coagulating said synthetic rubber and forming a masterbatch therewith of coprecipitated silica in the form of filterable crumbs by mixing an acid with such latex containing the alkali-metal silicate to produce a final pH of 2 to 6 in the aqueous medium of the coagulated synthetic rubber and coprecipitated silica at the completion of the coagulation of the masterbatch.

4. A process which comprises incorporating an alkali-metal silicate in a latex of a synthetic rubber copolymer of a butadiene-1,3 and copolymerizable material selected from the group consisting of vinyl pyridines, dialkylaminoalkyl acrylates, dialkylaminoalkyl methacrylates, dimethallylamine, ethylmethallylamine, N(dimethylaminoethyl) methacrylamide, vinyl quinoline and p-N,N-dimethylamino styrene, and coagulating said synthetic rubber and forming a masterbatch therewith of a coprecipitated silica in the form of filterable crumbs by mixing an acid with such latex containing the alkali-metal silicate to produce a final pH of less than 7 in the aqueous medium of the coagulated synthetic rubber and coprecipitated silica after addition of the acid.

5. A process which comprises incorporating an alkali-metal silicate in a latex of a synthetic rubber copolymer of butadiene-1,3 and a vinyl pyridine, and coagulating said synthetic rubber and forming a masterbatch therewith of a coprecipitated silica in the form of filterable crumbs by mixing an acid with such latex containing the alkali-metal silicate to produce a final pH of 2 to 6 in the aqueous medium of the coagulated synthetic rubber and coprecipitated silica after addition of the acid.

6. A process which comprises incorporating an alkali-metal silicate in a latex of a synthetic rubber copolymer of butadiene-1,3 and 2-methyl-5-vinyl pyridine, and coagulating said synthetic rubber and forming a masterbatch therewith of a coprecipitated silica in the form of filterable crumbs by mixing an acid with such latex containing the alkali-metal silicate to produce a final pH of 2 to 6 in the aqueous medium of the coagulated synthetic rubber and coprecipitated silica after addition of the acid.

7. A masterbatch of a rubber copolymer of a butadiene-1,3 with an unsaturated compound containing a basic nitrogen functional group and 5 to 100 parts of silica per 100 parts of said rubber, said silica and rubber being coprecipitated in the form of filterable crumbs from a mixture of a latex of such rubber and an alkali-metal silicate.

8. A masterbatch of a rubber copolymer of a butadiene-1,3 with an unsaturated compound containing an amino group and 5 to 100 parts of silica per 100 parts of said rubber, said silica and rubber being coprecipitated in the form of filterable crumbs from a mixture of a latex of such rubber and an alkali-metal silicate.

9. A masterbatch of a synthetic rubber copolymer of a butadiene-1,3 and a copolymerizable monomer containing an amino group and 5 to 100 parts of silica per 100 parts of said rubber, said silica and rubber being coprecipitated in the form of filterable crumbs from a mixture of a latex of such rubber and an alkali-metal silicate.

10. A masterbatch of a synthetic rubber copolymer of a butadiene-1,3 and copolymerizable material selected from the group consisting of vinyl pyridines, dialkylaminoalkyl acrylates, dialkylaminoalkyl methacrylates, dimethallylamine, ethylmethallylamine, N(dimethylaminoethyl) methacrylamide, vinyl quinoline and p-N,N-dimethylamino styrene, and 5 to 100 parts of silica per 100 parts of said rubber, said silica and rubber being coprecipitated in the form of filterable crumbs from a mixture of a latex of such rubber and an alkali-metal silicate.

11. A masterbatch of a synthetic rubber copolymer of a butadiene-1,3 and a vinyl pyridine and 5 to 100 parts of silica per 100 parts of said rubber, said silica and rubber being coprecipitated in the form of filterable crumbs from a mixture of a latex of such rubber and an alkali-metal silicate.

12. A masterbatch of a synthetic rubber copolymer of a butadiene-1,3 and 2-methyl-5-vinyl pyridine and 5 to 100 parts of silica per 100 parts of said rubber, said silica and rubber being coprecipitated in the form of filterable crumbs from a mixture of a latex of such rubber and an alkali-metal silicate.

References Cited in the file of this patent

UNITED STATES PATENTS

| | | |
|---|---|---|
| 2,560,043 | Schmidt | July 10, 1951 |
| 2,616,860 | Leukhardt et al. | Nov. 4, 1952 |
| 2,649,388 | Wills et al. | Aug. 18, 1953 |